(12) United States Patent
Tillinghast et al.

(10) Patent No.: US 10,139,211 B1
(45) Date of Patent: Nov. 27, 2018

(54) AMMUNITION COUNTER INTEGRATED INTO AMMUNITION CAN

(71) Applicants: Ralph C. Tillinghast, Hardwick, NJ (US); Michael T. Wright, Hopatcong, NJ (US); Ryan Saalman, Cataula, GA (US)

(72) Inventors: Ralph C. Tillinghast, Hardwick, NJ (US); Michael T. Wright, Hopatcong, NJ (US); Ryan Saalman, Cataula, GA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 451 days.

(21) Appl. No.: 14/843,019

(22) Filed: Sep. 2, 2015

(51) Int. Cl.
| *F42B 39/26* | (2006.01) |
| *B65D 25/54* | (2006.01) |
| *B65D 25/28* | (2006.01) |
| *B65D 25/20* | (2006.01) |
| *G01G 19/52* | (2006.01) |
| *G01G 19/64* | (2006.01) |
| *G01G 19/00* | (2006.01) |

(52) U.S. Cl.
CPC .............. *F42B 39/26* (2013.01); *B65D 25/20* (2013.01); *B65D 25/28* (2013.01); *B65D 25/54* (2013.01); *G01G 19/007* (2013.01); *G01G 19/52* (2013.01); *G01G 19/64* (2013.01)

(58) Field of Classification Search
CPC .. F41A 9/62; F42B 39/26; B65D 25/20; B65D 25/28; B65D 25/54; B65D 25/56; G01G 19/007; G01G 19/42; G01G 19/52; G01G 19/56; G01G 19/58
See application file for complete search history.

(56) References Cited

U.S. PATENT DOCUMENTS

| 1,379,215 | A | * | 5/1921 | Riedel | ............... | G01G 19/42 |
| | | | | | | 177/129 |
| 2,518,973 | A | * | 8/1950 | Atherton | ............... | A45C 13/28 |
| | | | | | | 177/131 |
| 2,710,083 | A | * | 6/1955 | White | ............... | A45C 13/28 |
| | | | | | | 177/148 |
| 2,759,577 | A | * | 8/1956 | White | ............... | G01G 19/58 |
| | | | | | | 177/148 |
| 2,937,016 | A | * | 5/1960 | Westman | ............... | A45C 13/28 |
| | | | | | | 177/131 |
| 3,090,454 | A | * | 5/1963 | Farrar | ............... | A45C 13/28 |
| | | | | | | 177/131 |
| 3,789,202 | A | * | 1/1974 | Yamanaka | ............... | G01G 7/02 |
| | | | | | | 177/200 |
| 4,108,363 | A | * | 8/1978 | Susumu | ............... | G07F 7/00 |
| | | | | | | 177/245 |
| 4,219,089 | A | * | 8/1980 | Gard | ............... | G01G 3/1406 |
| | | | | | | 177/128 |

(Continued)

*Primary Examiner* — Randy Gibson
(74) *Attorney, Agent, or Firm* — Michael C. Sachs (57) ABSTRACT

An ammunition can that provides a user with a count of stored ammunition, includes a housing and a window formed on one side of the housing to provide a visual indication of the count of the stored ammunition. The window extends from the top side to a bottom side of the housing, to provide a clear sampling view of the stored ammunition. A scale, disposed in close proximity to the window, provides a more accurate visual indication of the count of the stored ammunition.

6 Claims, 11 Drawing Sheets

(56) References Cited

U.S. PATENT DOCUMENTS

| | | | | |
|---|---|---|---|---|
| 4,566,070 A * | 1/1986 | Tanaka | G01G 19/42 | 177/1 |
| 4,646,767 A * | 3/1987 | Hikita | G07D 9/04 | 177/200 |
| 4,892,755 A * | 1/1990 | Eitman | C04B 30/02 | 427/193 |
| 5,206,444 A * | 4/1993 | Oliver | F41A 9/62 | 42/1.02 |
| 5,235,325 A * | 8/1993 | McCaughan, Jr. | H01H 35/006 | 200/85 R |
| 6,478,182 B2 * | 11/2002 | Karpisek | B65D 25/56 | 206/386 |
| 7,271,353 B1 * | 9/2007 | Lewis | G01G 19/58 | 177/131 |
| 7,378,604 B2 * | 5/2008 | Truong | A45C 13/28 | 177/131 |
| 7,589,287 B1 * | 9/2009 | Hargabus | G01G 19/414 | 177/148 |
| 7,629,542 B1 * | 12/2009 | Harding | G01G 19/58 | 177/148 |
| 7,897,884 B2 * | 3/2011 | Harish | G01G 23/3735 | 177/144 |
| 8,485,329 B1 * | 7/2013 | Roy | G01G 19/58 | 177/149 |
| 8,575,500 B1 * | 11/2013 | Genet, Sr. | G01G 19/58 | 177/148 |
| 8,713,835 B1 * | 5/2014 | Calvert | F41A 9/71 | 42/49.01 |
| 8,901,442 B1 * | 12/2014 | Dilone | A45C 13/18 | 177/127 |
| 8,944,249 B1 * | 2/2015 | Mullaney | B65F 1/14 | 177/144 |
| 9,080,910 B1 * | 7/2015 | Zyman Beer | G09B 21/003 | |
| 2001/0007307 A1 * | 7/2001 | Karpisek | B65D 25/56 | 206/386 |
| 2005/0051586 A1 * | 3/2005 | Siwak | A45C 13/28 | 224/576 |
| 2005/0217904 A1 * | 10/2005 | Hughes | A45C 15/00 | 177/245 |
| 2006/0266563 A1 * | 11/2006 | Kaplan | G01G 19/58 | 177/245 |
| 2007/0004048 A1 * | 1/2007 | Kikuchi | C01B 35/04 | 438/2 |
| 2007/0050058 A1 * | 3/2007 | Zuziak | G06F 19/3475 | 700/90 |
| 2007/0163813 A1 * | 7/2007 | Lewis | G01G 19/58 | 177/148 |
| 2007/0193786 A1 * | 8/2007 | Pohl | G01G 19/58 | 177/25.15 |
| 2009/0057037 A1 * | 3/2009 | Muniz | G01G 19/58 | 177/131 |
| 2009/0119113 A1 * | 5/2009 | Dancy | B65F 1/02 | 705/308 |
| 2009/0192764 A1 * | 7/2009 | Radcliff | G01G 19/52 | 702/188 |
| 2012/0167423 A1 * | 7/2012 | Kindt | F41A 9/62 | 42/1.02 |
| 2012/0186926 A1 * | 7/2012 | Sheikh | A45C 5/03 | 190/115 |
| 2012/0222904 A1 * | 9/2012 | Lu | G01G 19/58 | 177/148 |
| 2013/0048391 A1 * | 2/2013 | Lee | G01G 19/58 | 177/126 |
| 2013/0140097 A1 * | 6/2013 | Zyman Beer | G01G 19/56 | 177/148 |
| 2015/0129324 A1 * | 5/2015 | Zhao | A45C 15/00 | 177/127 |
| 2015/0237980 A1 * | 8/2015 | Shah | A45C 13/18 | 340/568.1 |
| 2015/0292936 A1 * | 10/2015 | Sheikh | G01G 19/58 | 190/115 |
| 2016/0356640 A1 * | 12/2016 | Freeman | G01G 19/52 | |
| 2017/0108370 A1 * | 4/2017 | Pyne | G01G 19/42 | |
| 2017/0307433 A1 * | 10/2017 | Espinosa | B65D 90/008 | |

\* cited by examiner

AMMUNITION COUNTER INTEGRATED INTO AMMUNITION CAN

GOVERNMENTAL INTEREST

The invention described herein may be manufactured and used by, or for the Government of the United States for governmental purposes without the payment of any royalties thereon.

FIELD OF THE INVENTION

The present invention relates in general to the field of munitions. Specifically, this invention relates to an ammunition counter that is integrated into an ammunition can so that it automatically and accurately communicates the number of remaining rounds of ammunition in the can.

BACKGROUND OF THE INVENTION

In a combat situation, a soldier is typically provided with an ammunition can that contains reserve ammunition, such as bullets. However, offer partial use of the reserve ammunition, the soldier is not provided with an accurate means for counting the ammunition remaining in the ammunition can. As a result, it has become necessary for the soldier to manually open and inspect the ammunition can, in order to manually count the number of the remaining rounds.

In the event of a fire fight, the soldier, not desiring to be short on ammunition, and incapable of wasting time to count the rounds remaining in the ammunition can, exchanges a partially full ammunition can with an ammunition can that contains the maximum number of rounds.

During reload, if a can is not refilled, the soldier may end up with less ammunition than is required. After a firefight, it is common practice to turn in all the ammunition cans that contain less than the original number of rounds. Such logistics cause a waste of valuable manpower and resources.

Therefore, there is still remains an unsatisfied need for an ammunition can having an integrated counter, for automatically and accurately notifying the soldier, or a command center, of the number of remaining rounds in the ammunition can.

SUMMARY OF THE INVENTION

The present invention addresses the foregoing concerns and presents a new ammunition can that communicates to a soldier, or to a command or logistics center, the accurate number of ammunition rounds remaining therein.

The present ammunition can allows the soldier to easily determine the number of remaining ammunition, effectively reducing the logistics since the counter that is integrated with the ammunition can, is selectively turned on. The present ammunition can increases responsiveness by allowing soldiers to quickly and accurately realize the current ammunition on hand. The present ammunition can has military and commercial applications in law enforcement and gun sports.

More specifically, the ammunition can includes a housing and a window formed on one side of the housing to provide a visual indication of the count of the stored ammunition. The window extends from the top side to a bottom side of the housing, to provide a clear sampling view of the stored ammunition. A scale, disposed in close proximity to the window, provides a more accurate visual indication of the count of the stored ammunition.

According to another embodiment, the ammunition can includes two strain gauges that are secured to the handle, to provide a measurement of the weight of the entire ammunition can, including the remaining rounds. A counter converts the measured weight into a number reflective of the remaining rounds, and displays this number onto a display.

According to yet another embodiment, the ammunition cans can be networked together to providing the necessary logistics to a command center.

BRIEF DESCRIPTION OF THE DRAWINGS

The accompanying drawings, which are incorporated in, and constitute part of this specification, illustrate embodiments of the invention and together with the description, serve to explain the principles of the invention. The embodiments illustrated herein are presently preferred, it being understood, however, that the present invention is not limited to the precise arrangements and instrumentalities shown, wherein.

Similar numerals refer to similar elements in the drawings. It should be understood that the sizes of the different components in the figures are not necessarily in exact proportion or to scale, and are shown for visual clarity and for the purpose of explanation.

DETAILED DESCRIPTION OF PREFERRED EMBODIMENTS

With reference to FIGS. 1 through 6, they illustrate an exemplary ammunition can 100 having a window 111 that provides a visual indication of its content, according to a first preferred embodiment of the present invention. In general, the ammunition can 100 includes a housing 120 that contains the ammunition, such as rounds 500 (FIG. 5) or any other ammunition that is amenable to a count.

Figures 1, 2:
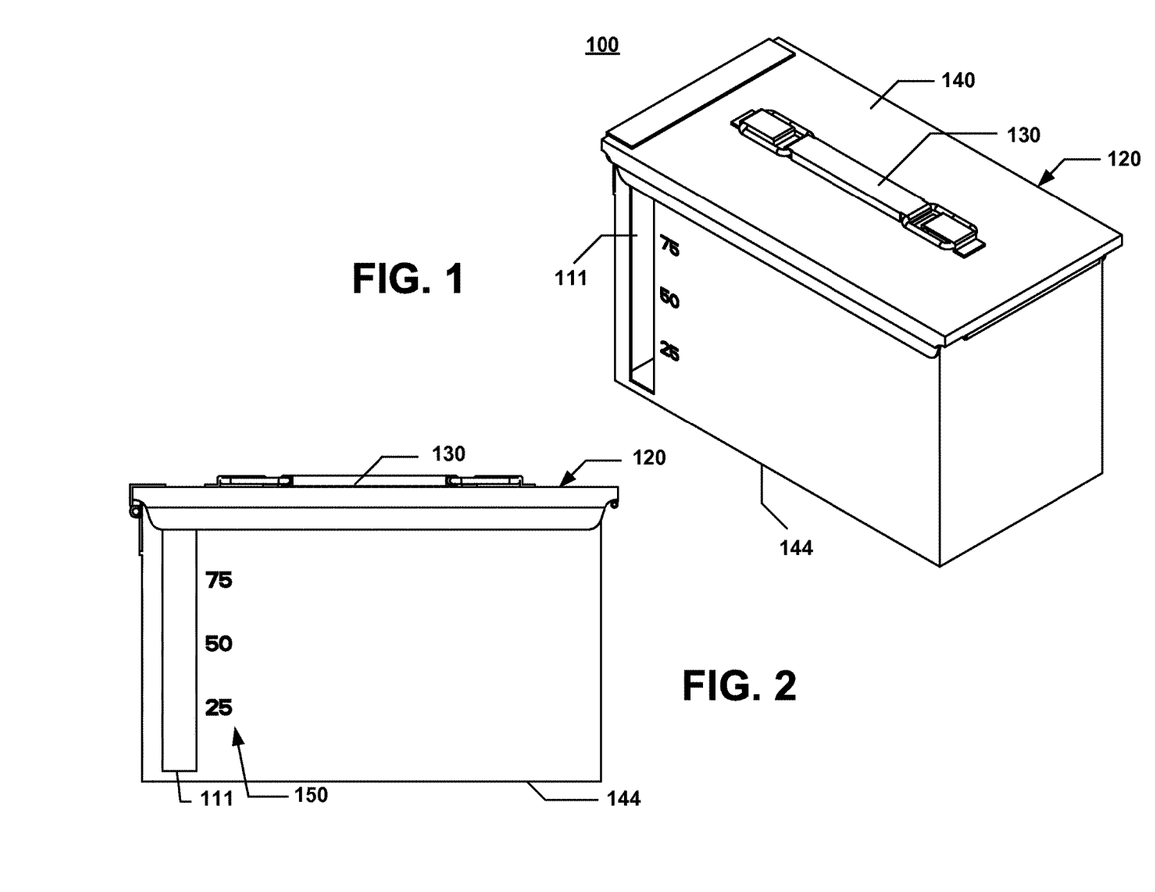
FIG. 1 is an isometric, perspective view of an exemplary ammunition can having a window that provides a visual indication of the content of the ammunition can, according to a first preferred embodiment of the present invention.
FIG. 2 is a front elevational view of the ammunition can of FIG. 1.
Figure 3:
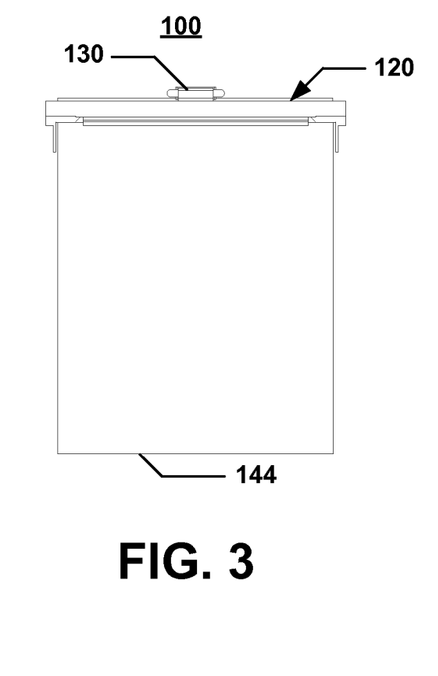
FIG. 3 is a side elevational view of the ammunition can of FIG. 1.
Figure 4:
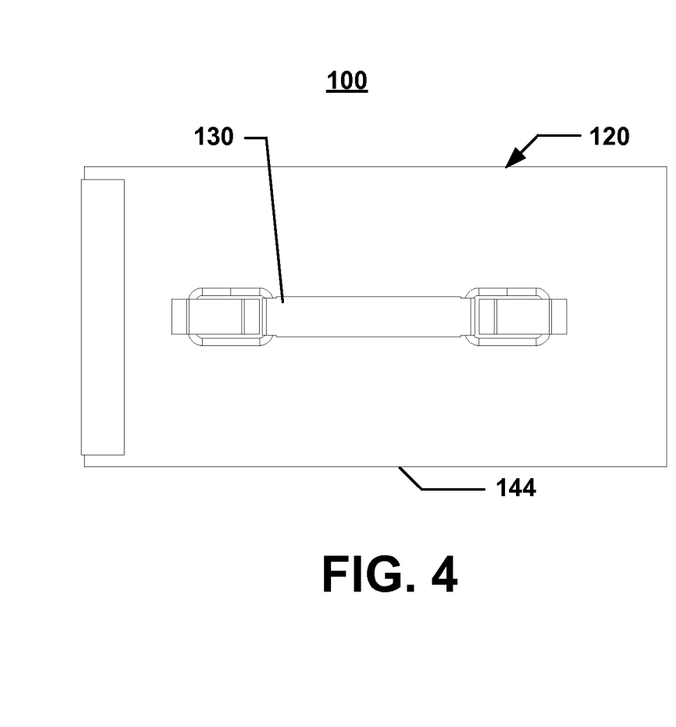
FIG. 4 is a top view of the ammunition can of FIG. 1.

The window 111 is formed on one of the sides of the housing 120, preferably along the height of the ammunition can 100, to provide a visual indication of the number of rounds 500 that are stored within the ammunition can 100. The rounds 500 will also be referred to herein as remaining ammunition or remaining rounds 500. The window 111 can be placed on any one or more of the four lateral sides of the ammunition can 100.

The window 111 is preferably made of a material that is resistant to shock, such as transparent hardened plastic.

The window 111 is preferably narrow, to minimize accidental damage. It preferably extends from the top side 140 of the ammunition can 100 to its bottom side 144, to provide a full view of the content of the ammunition can 100.

Figure 5:
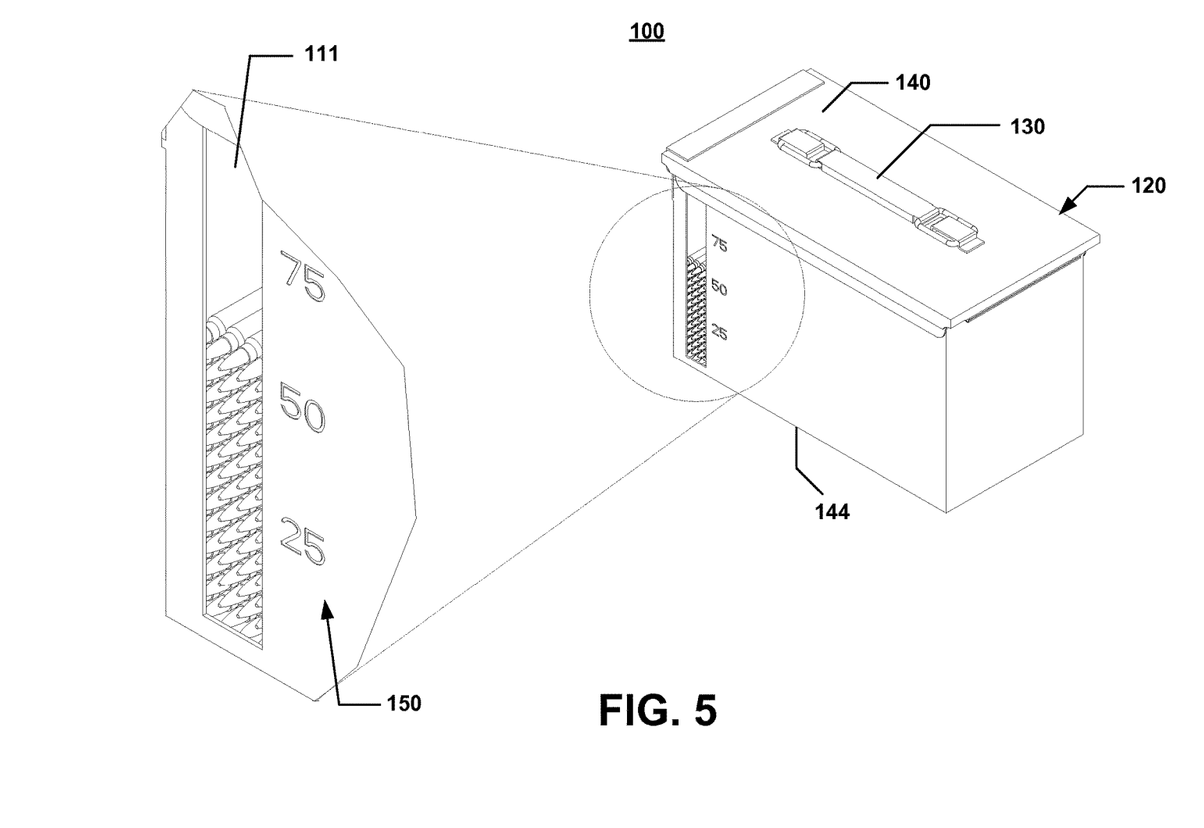
FIG. 5 is another enlarged view of the ammunition can of FIG. 1, further illustrating a scale that provides an approximate count of the rounds within the ammunition can.
Figure 6:
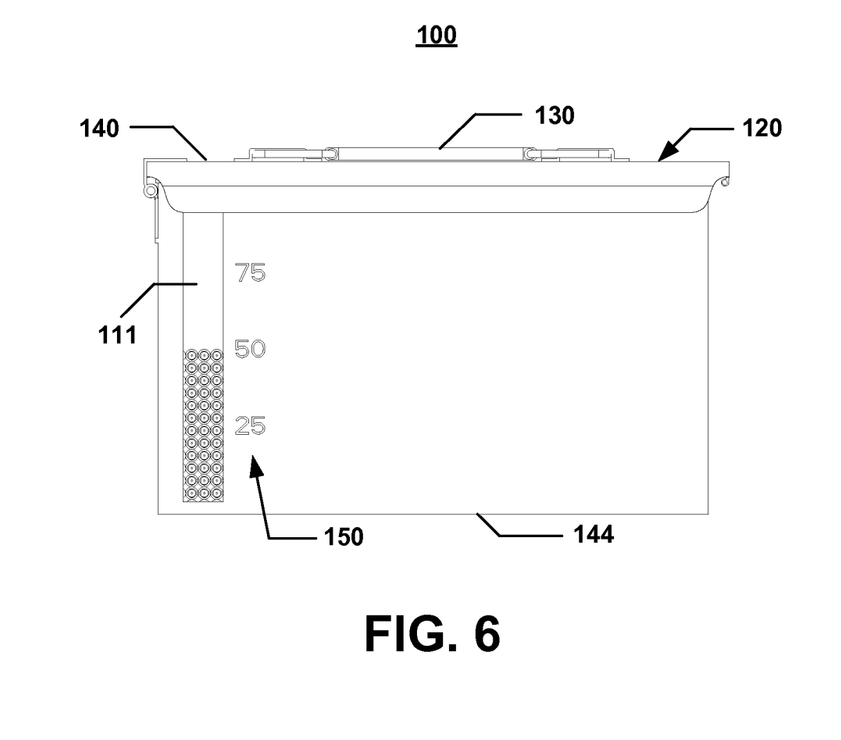
FIG. 6 is a front elevational view of the ammunition can of FIG. 5.

Next to the window 111, a scale 150 provides an approximate visual count of the remaining rounds 500. In this exemplary embodiment, the scale 150 provides a percentile indication (i.e., 25%, 50%, 75%) of the remaining rounds 500. While the present exemplary embodiment illustrates the use of the scale 150, it should be understood that any other known or available means of converting the physical change in the number of remaining rounds 500 into a numerical value may be used, and that the present invention is not limited to the use of the scale 150.

The ammunition can 100 is also provided with a handle 130 for carrying the housing 120, and also for assisting in the accurate measurement of the remaining rounds 500, as illustrated in the alternative embodiments of FIGS. 7 through 10, and 13.

Considering now another ammunition can 700 according to a second embodiment of the present invention, in connection with FIGS. 7 through 10, the ammunition can 700 is generally similar to the ammunition can 100 with the exception that it does not include the visual means for assessing the approximate number of remaining rounds 500, i.e., the window 111. Rather, the ammunition can 700 includes a counter 777 that provides an accurate reading of the number of the remaining rounds inside the ammunition can 700.

Figure 7:
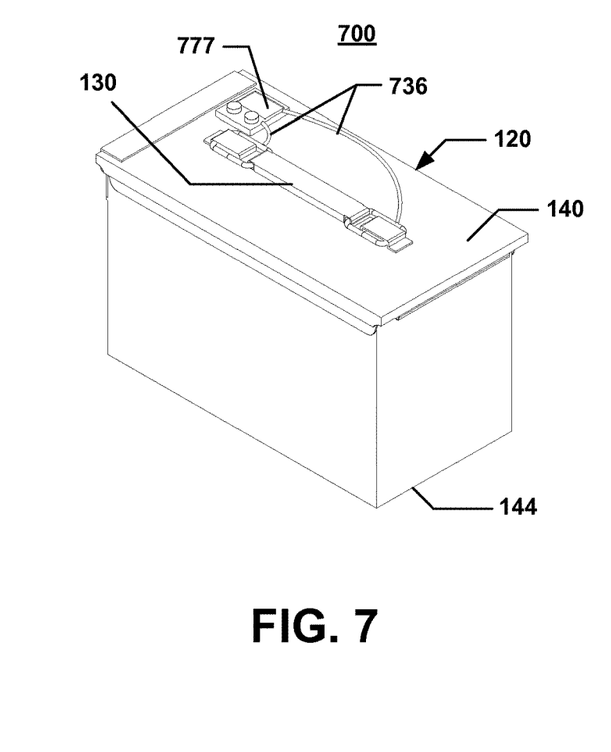
FIG. 7 is an isometric, perspective view of an exemplary ammunition can having a counter integrated therewith, for providing an accurate reading of the number of rounds remaining inside the ammunition can, according to a second preferred embodiment of the present invention.
Figure 8:
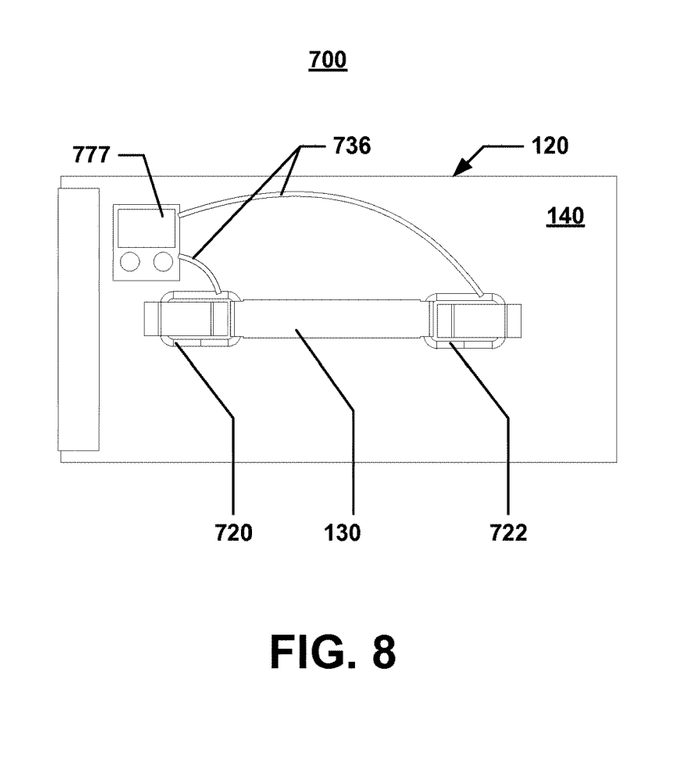
FIG. 8 is a top view of the ammunition can of FIG. 7.
Figure 9:
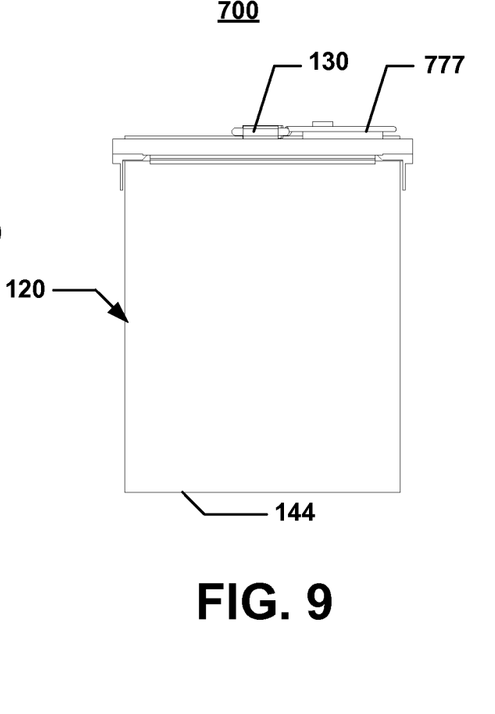
FIG. 9 is a side elevational view of the ammunition can of FIG. 7.
Figure 10:
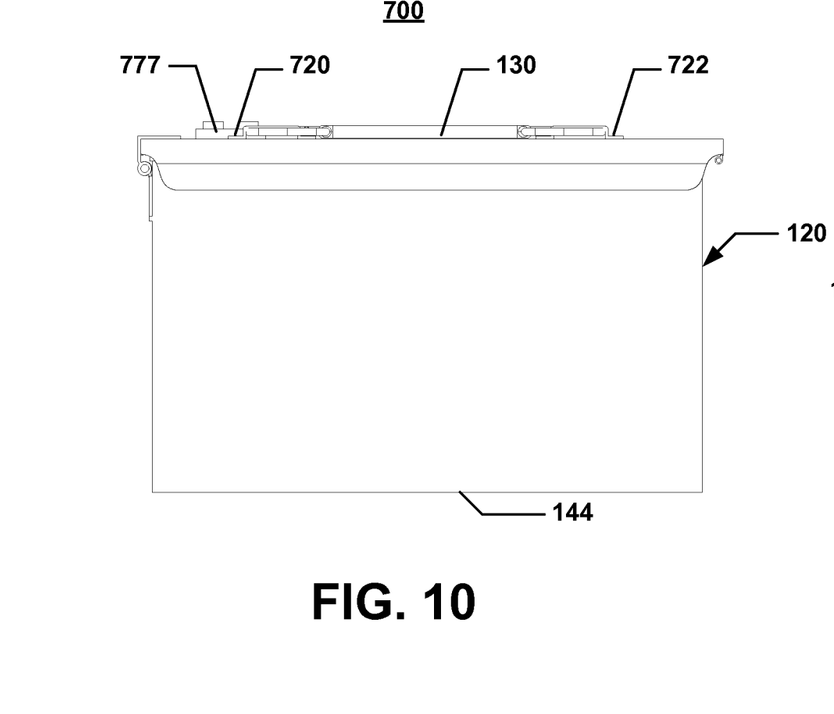
FIG. 10 is a front elevational view of the ammunition can of FIG. 7.

In this exemplary embodiment, the counter 777 is illustrated as being mounted on the top side 140 of the housing 120. It should be understood that the counter 777 could alternatively be mounted on any side of the housing 120 that provides access to the soldier.

The counter 777 is electrically connected to the strain gauges 720, 722 by means of conductors or cables 736. The strain gauges 720, 722 are secured to both ends of the handle 130. Alternatively, the strain gauges 720, 722 can be integrated with the handle 130. The strain gauges 720, 722 determine the approximate quantity of ammunition 500 remaining in the ammunition can 700, by measuring the weight of the remaining rounds 500 inside the ammunition can 700. The operation of the counter 777 will be explained later in more detail in connection with FIG. 12.

Figure 11:
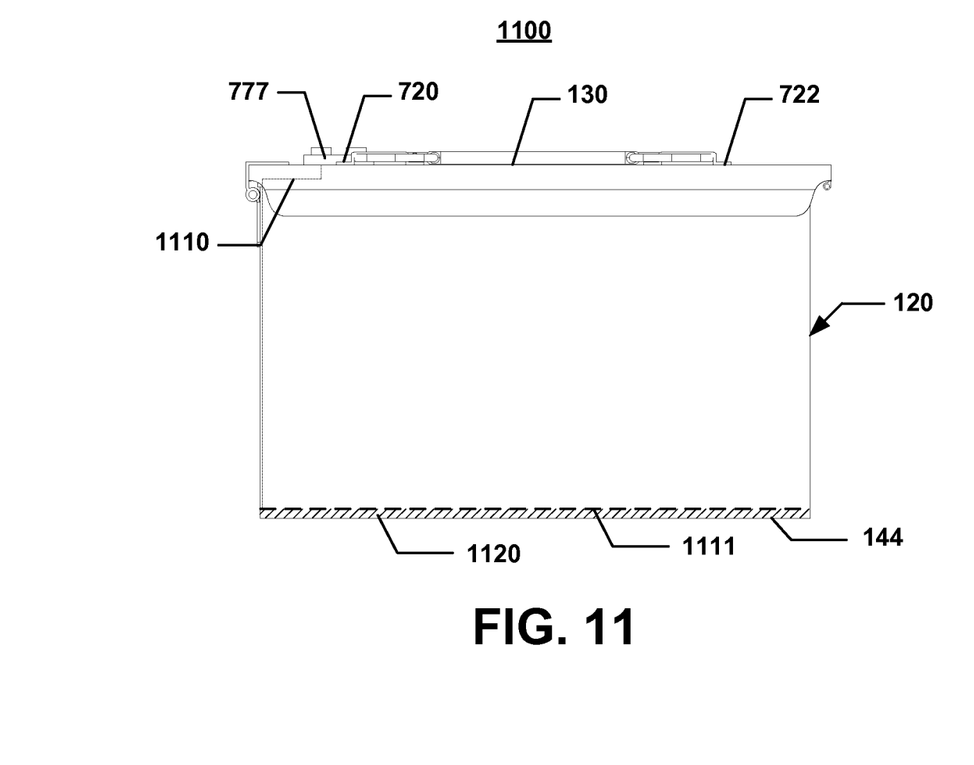
FIG. 11 is a front elevational view of yet another ammunition can, further illustrating a sensing layer according to a third embodiment of the present invention.

FIG. 11 illustrates an ammunition can 1100 according to yet another embodiment of the present invention. The ammunition can 1100 is provided with a sensing layer, also referred to herein as weight sensor 1120 that is disposed on the bottom side 144 of the ammunition can 1100, underneath a platform 1111.

The sensing layer 1120 can be formed of means to convert the weight of the remaining rounds 500 within the ammunition can 1100 into a digital reading that is sent to the counter 777, via a conductor or cable 1110. As an example, the sensing layer 1120 may be formed of piezoelectric elements, or similar other known or available means for generating a signal that is proportional, or indicative, of the weight of the remaining rounds 500.

The platform 1111 may be either movable or flexible. If car be either dimensioned to fit the inner dimensions of the ammunition can 1100, so that it is capable of moving upwardly or downwardly relative to the sides of the ammunition can 1100. Alternatively, the edges of the flexible platform 1111 can be secured to the inner sides of the ammunition can 1100, so that the platform 1111 is allowed to bend or bow under the weight of the remaining rounds 500.

FIG. 11 also shows the strain gauges 720, 722 in dashed lines to indicate that these gauges can optionally be added to the ammunition can 700, so that the combination forms the ammunition can 1100.

Figure 12:
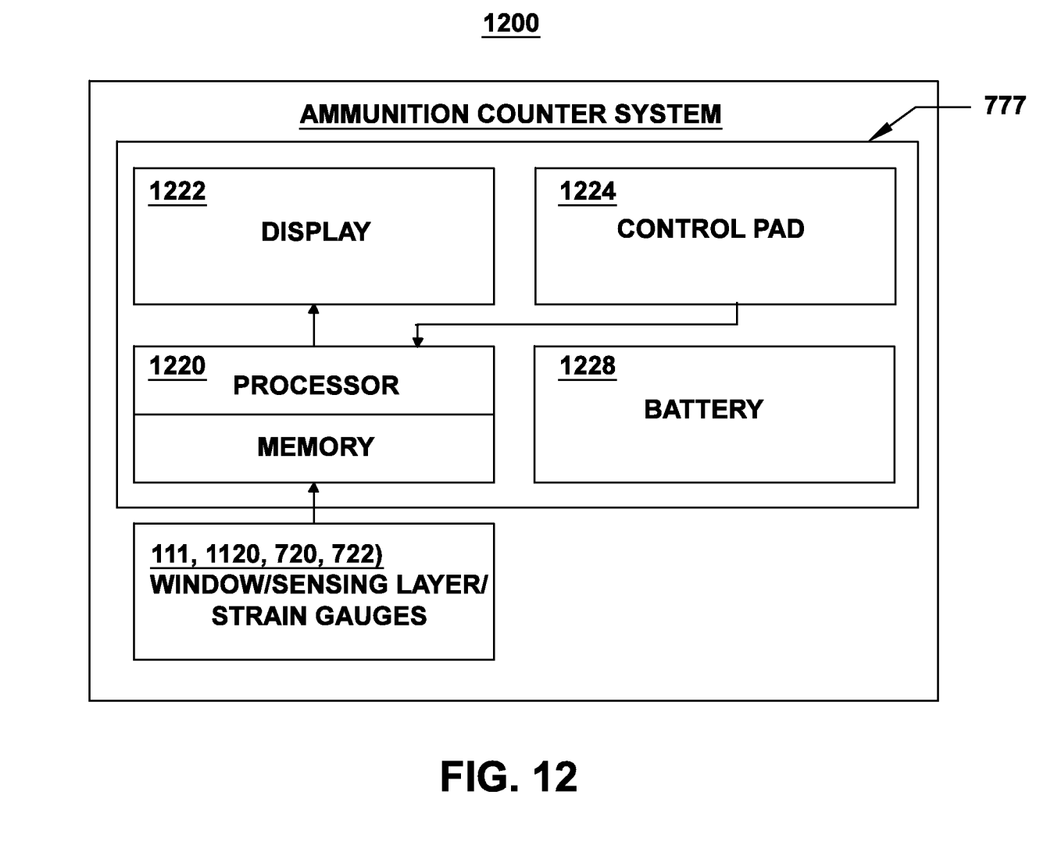
FIG. 12 is a block diagram of an ammunition counter system used in the ammunition cans of FIGS. 7 through 11.

FIG. 12 is a block diagram of an ammunition counter system 1200 used in the ammunition cans of FIGS. 7 through 11. The ammunition counter system 1200 is basically comprised of the counter 777 and the various means for measuring the weight of the remaining rounds 500, such as the strain gauges 720, 722, and/or the sensing layer 1120. It would also be possible to use the ammunition can 100 but the soldier will need to manually enter the visually recognized number of remaining rounds 500, using the control pad 1224.

The counter 777 is generally formed of a processor 1220 that accepts the output of the strain gauges 720, 722, and/or the sensing layer 1120, and calculates the number of the remaining rounds 500. In turn, the processor 1220 transmits the calculated number of the remaining rounds 500 to a display 1222, which provides the soldier with a simple number that helps the soldier in assessing his/her potential need for more ammunition.

In use, the soldier uses the display 1222 and a control pad 1224 to select the type of ammunition contained within the ammunition can 700, 1100. In the embodiment of FIGS. 6 through 10 (and optionally FIG. 11), the soldier lifts the handle 130 to allow the strain gauges 720, 722 in the handle 130, to register the total weight of the ammunition can and the remaining rounds 500 inside the ammunition can 700, 1100. The processor 1220 accesses the information stored on a memory 1226, to determine the values for the empty ammunition can 700, 1100, the weight of each selected round, and the weight of the sensing system used, i.e., the strain gauges 720, 722, or the platform 1111 along with the associated cabling.

The processor 1220 subtracts the weights of the empty ammunition can 700, 1100 and the sensing system, from the registered total weight, to provide an accurate total weight of the remaining rounds 500 inside the ammunition can 700, 1100. The processor 1220 divides the total ammunition weight by the stored value of one round of ammunition, generating the total number of rounds 500 remaining inside the ammunition can 700, 1100.

The processor 1220 then displays this value on the display 1:222, allowing the soldier to visually see the number of ammunition left within the ammunition can 700, 1100.

A power source, including but not limited to a battery 1228, powers the various components of the ammunition counter system 1200.

Figure 13:
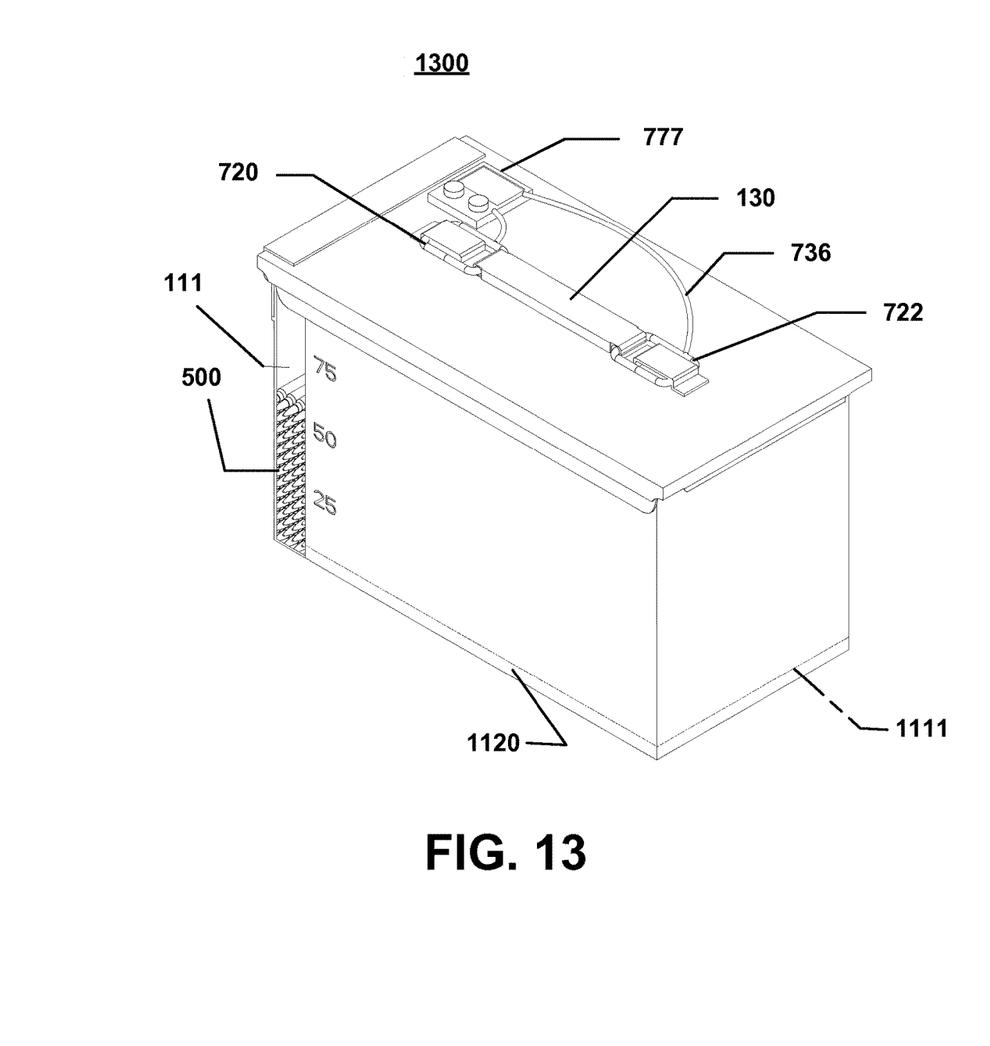
FIG. 13 is an isometric, perspective view of an exemplary ammunition can having a counter and a window integrated therewith, according to a fourth preferred embodiment of the present invention.

FIG. 13 represents yet another exemplary ammunition can 1300, according to a fourth preferred embodiment of the present invention. The ammunition can 1300 illustrates a combination of the features of the previous embodiments. It incorporates a window 111, a counter system 1200 (FIG. 12) comprised of the counter 777 and the strain gauges 720, 722, and a sensing layer/platform combination 1120, 1111.

This embodiment illustrates the fact that the features of the various embodiments may be combined, selectively, depending on the desired accuracy, to suit the specific application for which the ammunition can is designed. Although the present invention is described with respect to military applications, it should be clear that it can be used in numerous commercial applications, including but not limited to law enforcement and gun sports.

Figure 14:
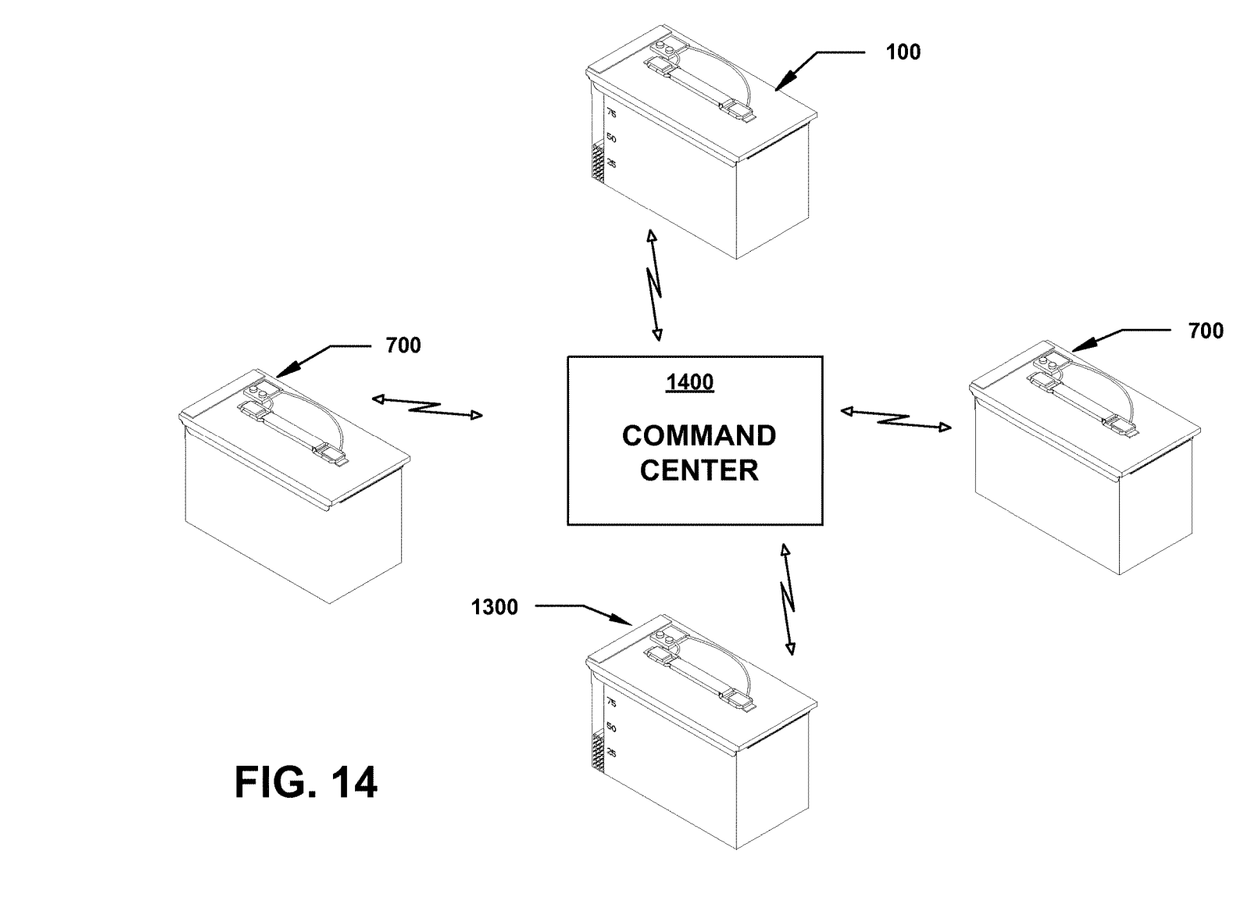
FIG. 14 is a block diagram of a network of ammunition cans, shown in communication with a command center.

FIG. 14 is a block diagram of a network 1500 of various ammunition cans, i.e., 100, 700, and/or 1300 shown in communication with a command center 1400, for keeping the communication center 1400 apprised of the overall and individual logistics of the ammunitions on the field. Some or all the ammunition cans 100, 700, 1300, are able to communicate with the command center 1400 using various protocols.

As an example, communication can be established automatically and periodically, so that the command center 1400 is constantly advised of the quantity of ammunition on the field. As another example, the ammunition cans 100, 700 communicate with the command center 1400 only when instructed by the soldier, or when the soldier lifts the ammunition can 700. As yet another example, communication can be initiated by the command center 1400, as needed. It should be understood that communication could be wireless, by means of cables, or by any other suitable known or available means to establish a network communication.

Figure 15:
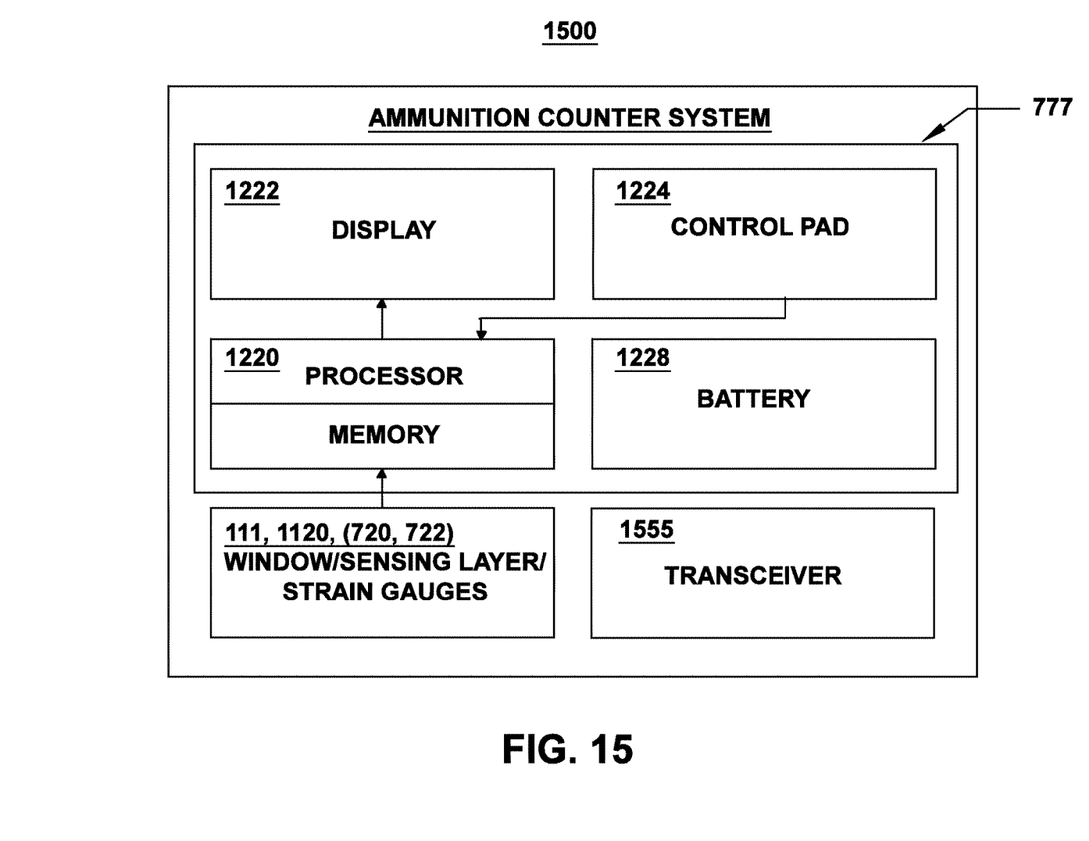
FIG. 15 is a block diagram of an ammunition counter system of one of the ammunition cans of FIG. 14, illustrating a transceiver for establishing communication with the command center of FIG. 14.

FIG. 15 is a block diagram of an ammunition counter system 1500 of one of the ammunition cans of FIG. 14, illustrating a transceiver 1555 for establishing communication with the command center 1400 of FIG. 14. The ammunition counter system 1500 is generally similar to the ammunition counter system 1200 of FIG. 12, with the exception of its ability to communicate with the command center 1400.

It is to be understood that the phraseology and terminology used herein with reference to device, mechanism, system, or element orientation (such as, for example, terms like "front", "back", "up", "down", "top", "bottom", "forward", "rearward", and the like) are only used to simplify the description of the present invention, and do not alone indicate or imply that the mechanism or element referred to must have a particular orientation. In addition, terms such as "first", "second", and "third" are used herein and in the appended claims for purposes of description and are not intended to indicate or imply relative importance or significance.

It is also to be understood that the invention is not limited in its application to the details of construction and the arrangements a' components set forth in the following description or illustrated in the drawings. Other modifications may be made to the present design without departing from the spirit and scope of the invention. The present invention is capable of other embodiments and of being practiced or of being carried out in various ways, such as, for example, in military and commercial applications.

What is claimed is:

1. An ammunition can (100) that provides any of a user or a command center with a percentage count of then currently stored ammunition (500), comprising:
    a housing (120) that contains the ammunition;
    means including strain gauges (720, 722) for providing the weight of the ammunition can including the stored ammunition; and
    a counter (777) that is electrically connected to the means for providing the weight; and
    wherein the counter calculates the percentage number of the stored ammunition based on the then currently measured weight of the ammunition can including stored ammunition weight.

2. The ammunition can of claim 1, wherein the means for providing the weight of the ammunition can, including stored ammunition, includes a flexible platform (1111) that is disposed in proximity to a bottom side of the container; and
    a sensing layer (1120) including piezoelectric elements disposed between the platform and the bottom side, to convert the weight of the stored ammunition, including stored ammunition, into a representative electrical signal, and to transmit the representative electrical signal to the counter (777).

3. The ammunition can of claim 2, further including a handle (130); and
    wherein the means for providing the weight of the ammunition can, including stored ammunition, includes strain gauges (720, 722).

4. The ammunition can of claim 1, further including:
    a window (111) formed within the housing to provide a visual indication of the approximate count of the stored ammunition;
    wherein the window extends from a top side to one side of the housing, to an opposite side, to provide a clear sampling view of the stored ammunition; and
    a scale (150), disposed in close proximity to the window, to provide an approximate visual count of the stored ammunition (as a percentage remaining).

5. The ammunition can of claim 1, wherein the counter (777) includes a display (1222), a control pad 1224), a processor (1220), a memory (1226), and a power source (1228).

6. The ammunition can of claim 1, wherein the counter (777) is secured to a top side of the housing.

* * * * *